United States Patent
Liu et al.

(10) Patent No.: US 11,983,929 B2
(45) Date of Patent: May 14, 2024

(54) METHOD FOR ADAPTIVELY CALCULATING SIZE OF GAUSSIAN KERNEL IN CROWD COUNTING SYSTEM

(71) Applicant: CRSC COMMUNICATION & INFORMATION GROUP COMPANY LTD., Beijing (CN)

(72) Inventors: Yang Liu, Beijing (CN); Dawei Jiao, Beijing (CN); Tianjiao Yang, Beijing (CN); Hongyan Li, Beijing (CN); Tao Zhang, Beijing (CN); Ang Zhu, Beijing (CN); Jie Li, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 384 days.

(21) Appl. No.: 17/607,224

(22) PCT Filed: Apr. 24, 2020

(86) PCT No.: PCT/CN2020/086532
§ 371 (c)(1),
(2) Date: Oct. 28, 2021

(87) PCT Pub. No.: WO2021/093275
PCT Pub. Date: May 20, 2021

(65) Prior Publication Data
US 2022/0222945 A1    Jul. 14, 2022

(30) Foreign Application Priority Data
Nov. 12, 2019  (CN) .......................... 201911098588.8

(51) Int. Cl.
*G06V 20/52*    (2022.01)
*G06V 10/44*    (2022.01)
*G06V 10/774*   (2022.01)

(52) U.S. Cl.
CPC ............ *G06V 20/53* (2022.01); *G06V 10/454* (2022.01); *G06V 10/774* (2022.01)

(58) Field of Classification Search
CPC .... G06V 20/53; G06V 10/454; G06V 10/774; G06V 40/10; G06V 10/82; G06F 18/214
(Continued)

(56) References Cited

U.S. PATENT DOCUMENTS 10,832,416 B2 *  11/2020  Tao ......................... G06V 20/53
10,853,943 B2 *  12/2020  Laradji ............... G06F 18/2148
(Continued)

FOREIGN PATENT DOCUMENTS

CN     107506692 A     12/2017
CN     110020606 A      7/2019

OTHER PUBLICATIONS

International Search Report in corresponding International Application No. PCT/CN2020/086532, dated Aug. 10, 2020; 6 pgs.
(Continued)

*Primary Examiner* — Ali Bayat
(74) *Attorney, Agent, or Firm* — HAUPTMAN HAM, LLP

(57) ABSTRACT

A method of calculating a size of a Gaussian kernel in a crowd counting system. The method includes dividing a crowd density map into several areas at equal intervals; calculating an estimated value of average distance of k nearest heads with respect to a head center point coordinate of a current person; calculating a weight coefficient for an average distance of k nearest heads; calculating a size of a Gaussian kernel corresponding to the head center point coordinate of the current person; determining whether there are any head center point coordinates of which sizes of Gaussian kernels have not been calculated yet in training data. If there are head center point coordinates of which
(Continued)

sizes of the Gaussian kernels have not been calculated in the training data, recalculating an estimated value of average distance of k nearest heads with respect to another head center point coordinate of another current person.

10 Claims, 1 Drawing Sheet

(58) Field of Classification Search
USPC .......................................................... 382/103
See application file for complete search history.

(56) References Cited

U.S. PATENT DOCUMENTS

| | | | |
|---|---|---|---|
| 2018/0253629 A1* | 9/2018 | Bamba | G06F 18/2148 |
| 2020/0311440 A1* | 10/2020 | Bamba | G06V 10/50 |
| 2020/0387718 A1* | 12/2020 | Chan | G06T 17/00 |
| 2021/0082127 A1* | 3/2021 | Yano | G06T 3/40 |
| 2021/0117686 A1* | 4/2021 | Shah | G06V 20/52 |
| 2021/0158555 A1* | 5/2021 | Maeda | G06T 7/60 |

OTHER PUBLICATIONS

First Office Action issued in priority Chinese Application No. 201911098588, dated Sep. 29, 2022; 15 pgs.

* cited by examiner

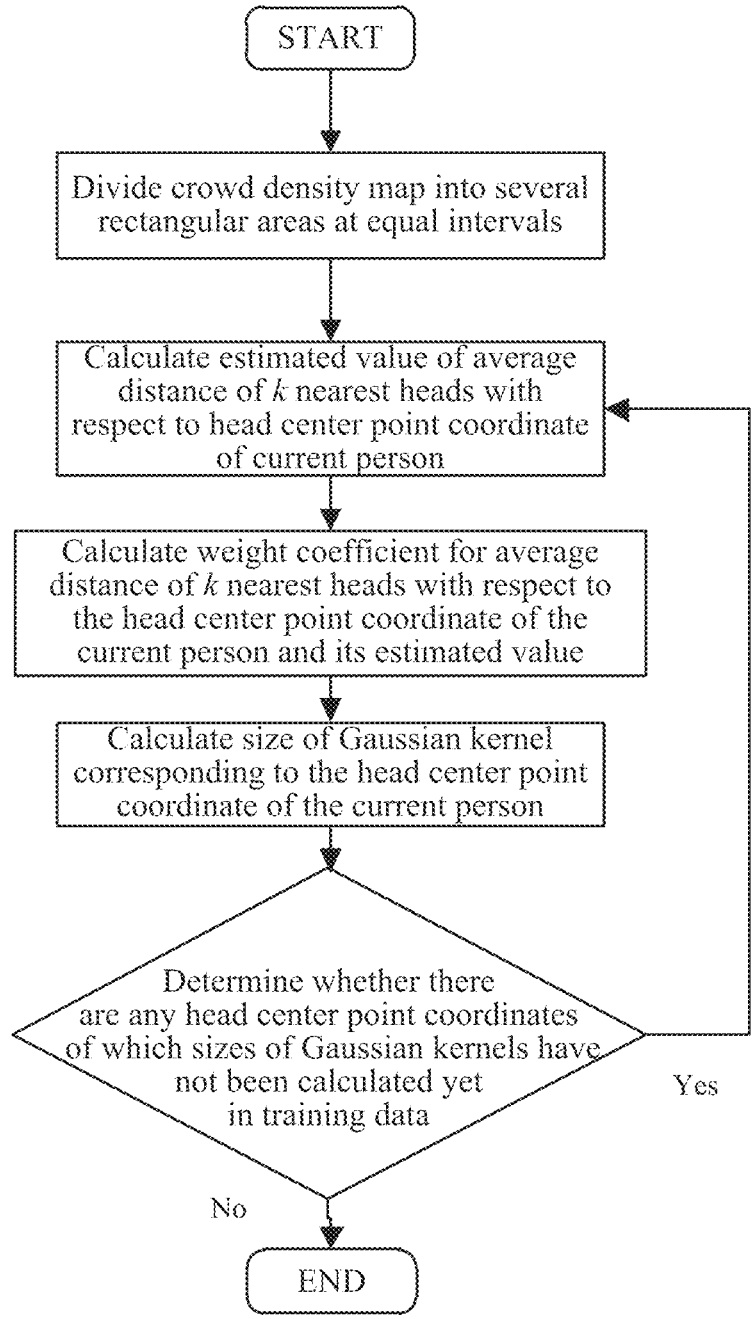

METHOD FOR ADAPTIVELY CALCULATING SIZE OF GAUSSIAN KERNEL IN CROWD COUNTING SYSTEM

The present application is a U.S. National Phase of International Application Number PCT/CN 2020/086532 filed Apr. 24, 2020, and claims priority to Chinese Application Number 2019110985888 filed Nov. 12, 2019.

FIELD OF THE INVENTION

The present disclosure relates to a field of pattern recognition, in particular to a method for adaptively calculating a size of a Gaussian kernel in a crowd counting system that is applied on computer vision technology.

BACKGROUND OF THE INVENTION

In recent years, a basic approach commonly used in crowd behavior analysis is a crowd counting system based on deep learning of a convolutional neural network. The main principle of the system is automatic learning of key characteristics of human head (such as approximately circular shape, darker hair relative to the background etc.) by the convolutional neural network through a lot of training, and then difference comparison between a convolution map output by the convolutional neural network and a pre-made crowd density map which uses a human head shape-like two-dimensional Gaussian kernel density function (hereinafter referred to as the Gaussian kernel) to indicate a location of the head of an individual. Because a sum of integrals of values at every pixels of a single Gaussian kernel in the crowd density map is 1, the system can thereby obtain an estimated number of the total number of people in an original image by merely statistically outputting a sum of integrals of values at all pixels belonging to respective Gaussian kernels in the crowd density map. The system uses the estimated number of the total number of people, an actual number in training data and a difference between the convolution map output by the network and the crowd density map in the training data as reference for reverse error propagation of the convolutional neural network, and then modifies relevant parameters in the network through iterations to train ability of identification of human head shaped targets by the convolutional neural network.

As mentioned above, during generating of the training data of the crowd counting system, the most critical step is to generate Gaussian kernels that simulate shapes of human heads in the original image with using two-dimensional coordinates of respective heads as center points. However, there is a problem in this case that, according to the principle of perspective relationship, the human heads in the original image will generally show an obvious phenomenon, i.e., "a big look at near and a small look in the distance". Therefore, the Gaussian kernels used to simulate the shapes of the human heads need to differentially configure widths of the Gaussian kernels at different positions in the crowd density map in terms of a perspective relationship of a space that the original image corresponds to so as to more accurately simulate a size pattern rule of the heads at different positions in the original image. In this way, the convolutional neural network can quickly and accurately learn the characteristics of the human heads during training, and improve the ability of identifying human head targets. Factors that can most intuitively reflect the spatial perspective relationship in an image are line features that have strong directionality in the background, a size of a person's body (i.e., how many pixels it occupies) and the like. However, in practical applications, just similar to the problem that is suffered from sizing human heads, these above factors are generally not collected and labeled by typical existing data sets, and thus workload and time cost by manual labeling are unbearable for a project. Moreover, even if enormous labor and material resources have been invested to label them, for a common highly crowded image, the above-mentioned factors would become incomplete due to occlusion and overlap, and thus still seriously affect accuracy of an algorithm for estimating the perspective relationship.

Existing technical documents has abandoned the above-mentioned method which tries to obtain additional information from a data set picture, but only uses the information of center point coordinates of those existing heads in the data set. An indirect manner is used, in which a trend in the perspective relationship regarding how big a look at near and how small a look in the distance is estimated using a head size trend reflected in terms of distances between head center point coordinates that have been labeled in the data set. Finally, through a large number of experiments, a coefficient relationship between K nearest distances, that are distances between a head center point coordinate of a certain head and K neighboring heads closest to the head, and an average size of the head (i.e., its corresponding a size of a Gaussian kernel) is find out and summarized. Finally, a width of each Gaussian kernel is flexibly adjusted using the above approach so that a generated crowd density map is much closer to the perspective relationship "a big look at near and a small look in the distance" of the heads in the original image. Thus, a purpose of accelerating convergence of the algorithm and improving accuracy of the result is achieved. The specific process is as following:

An original image having human heads is converted into a crowd density map.

The image with N heads is represented as:

$$H(x) = \sum_{i=1}^{N} \delta(x - x_i) \quad (1)$$

In order to well mate the density map with the image having diverse perspectives (different head sizes) and dense crowds, the inventor improved a traditional Gaussian kernel-based density map, and proposed a density map based on geometrically adapted Gaussian kernel, which is expressed by the following formula:

$$F(x) = \sum_{i=1}^{N} \delta(x - x_i) * G_{\sigma_i}(x) \text{ with } \sigma_i = \beta * \overline{d^i}, \overline{d^i} = \frac{1}{m}\sum_{j=1}^{m} d_j^i \quad (2)$$

Where $x_i$ indicates a pixel position of a human head in the image, $\delta(x-x_i)$ indicates an impact function of the human head position in the image, N is the total number of human heads in the image, $$\overline{d^i} = \frac{1}{m}\sum_{j=1}^{m} d_j^i$$

is an average distance of distances between the $x_i$ head and m human heads closest to the $x_i$ head (usually ahead size is related to a distance between centers of two adjacent persons in the crowded scene, and $\overline{d^i}$ is approximately equal to the head size in the case of dense crowds). Experiments verify that $\beta=0.3$ would have the best outcome. The density map generated in this way has a small/large variance of the Gaussian kernel at the position where the head is small/large (concentrated/scattered), which can well characterize the characteristics of the head size.

The above method is suitable for scenes having dense crowds and uniform distances. However, changes in realistic scenes are complex, especially for scenes such as bus stations and road intersections where not only are the crowd densities very different over different times and different locations, but also distance distributions among person to person are extremely uneven, and there is no clear dividing lines between crowds of different densities either. Therefore, application of the above method onto practical crowd pictures would encounter some problems. For example, with respect to a person with his/her head located in the unevenly distributed area of the crowd, a person with his/her head located at the remote of the original image and far away from the surrounding people, and a person with his/her head nearby but a head center point distance is shorten due to occlusion with another, and the like, the existing algorithm only considers the head center point distances between the person and his/her surrounding k (considering the calculation complexity, the value of k should not be too large) persons, which is very likely to set a width of the Gaussian kernel density function (referred to as the Gaussian kernel) corresponding to anyone of above-mentioned heads significantly different from that of the surrounding persons. As a result, there always are significant feature difference at these positions between a convolutional map obtained from the original image by the convolutional neural network and the crowd density map in the training data, which not only makes training of the convolutional neural network difficult to converge, but also cause the accuracy of the crowd counting system to decrease.

SUMMARY OF THE DISCLOSURE

In view of these above problems, the present disclosure aims to provide a method for adaptively calculating a size of a Gaussian kernel in a crowd counting system, which effectively increases feature similarity between a crowd density map in training data and a real image so that a regular pattern between the training data and the real image can be more readily learned by a convolutional neural network, convergence of its iterative process may be accelerated, and an accuracy of the crowd counting system may be improved.

In order to achieve the above objective, the present disclosure implements a technical process as following. A method for adaptively calculating a size of a Gaussian kernel in a crowd counting system, includes steps of: 1) dividing a crowd density map into m×n rectangular areas at equal intervals; 2) calculating an estimated value of average distance of k nearest heads from a head center point coordinate of a current person; 3) calculating a weight coefficient θ for an average distance of k nearest heads from the head center point coordinate of the current person and the estimated value; 4) calculating a size of a Gaussian kernel corresponding to the head center point coordinate of the current person; 5) determining whether there are any head center point coordinates of which sizes of Gaussian kernels have not been calculated yet in training data: if there are head center point coordinates of which the sizes of the Gaussian kernels have not been calculated in the training data, proceeding to the step 2); if not, outputting all sizes of Gaussian kernels that have been calculated as a result, and ending the process.

Further, in the step 1), an approach of dividing the crowd density map into m×n areas at equal intervals is configure to divide the crowd density map into m and n segments at equal intervals along directions of the x axis and the y axis, respectively, and form m×n rectangular areas in the crowd density map, wherein x-axis coordinate and a y-axis coordinate of a vertex of each area that is closest to the origin of the coordinate system are $p_{reg\_x}[i]$ and $p_{reg\_y}[j]$, respectively; every four vertices determine one rectangular area; with respect to a head center point coordinate ($p_{head\_x}$, $p_{head\_y}$), if it is located between $p_{reg\_x}[i]$, $p_{reg\_x}[i+1]$ in the x axis direction and between $p_{reg\_y}[j]$, $p_{reg\_y}[j+1]$ in the y axis direction, then said head center point coordinate belongs to an area [i, j]; l=1, ..., m, and j=1, ..., n.

Further, if there are more than one head center coordinates within the area [i, j], the rth head therein is referred to be as [i, j, r].

Further, in the step 2), the estimated value of average distance of k nearest heads from the head center point coordinate of the current person is calculated by 2.1) calculating an average distance of k nearest heads from a vertex coordinate of the current area; 2.2) applying bilinear interpolation to obtain estimated values of average distance of k nearest heads with respect to every head center point coordinates in each area.

Further, in the step 2.1), taking a vertex of the current area that is closest to the origin of the coordinate system as an example, if there is one head center point coordinate and the only one in rectangular areas adjacent to the vertex of the current area, then an average distance $\bar{d}_{ks}[i, j]$ of k nearest heads from said vertex is directly equal to a value of this head center point coordinate.

If there are multiple head center coordinates in the rectangular areas adjacent to said vertex of the current area, then k heads having the shortest distances from a coordinate of said vertex are taken, and an outcome of dividing 1 by a sum of a distance between a head center point coordinate of an individual and the vertex plus a very small positive number ε that prevents the denominator from being zero is applied as a weight coefficient $c_{ks}[i, j, r]$ of the average distance of k nearest heads with respect to said head, then a value calculated in a weighted averaging manner as following serves as an average distance of k nearest heads with respect to said vertex $\bar{d}_{ks}[i, j]$ that is: dividing a sum of products, each of which is a result of multiplying an average distance $\bar{d}_{ks}[i, j, r]$ of k nearest heads with respect to each of all heads by its corresponding weight coefficient $c_{ks}[i, j, r]$, by a sum of the weight coefficients corresponding to respective heads; wherein if the number of the multiple head center coordinates is less than k, then taking as many as possible.

Repeating the above processes to obtain average distances $\bar{d}_{ks}[i+1, j]$, $\bar{d}_{ks}[i, j+1]$ $\bar{d}_{ks}[i+1, j+1]$ of k nearest heads with respect to respective other three vertices in the current area.

Further, in the step 2.2), after the average distances $\bar{d}_{ks}[i, j]$, $\bar{d}_{ks}[i+1, j]$, $\bar{d}_{ks}[i, j+1]$, $\bar{d}_{ks}[i+1, j+1]$ of k nearest heads with respect to respective four vertices of a certain rectangular area are obtained, applying bilinear interpolation method to calculate an estimated value of average distance of k nearest heads with respect to anyone of the head center point coordinates within the rectangular area, and then labeling said one as a head center point coordinate of which a size of its Gaussian kernel has been calculated.

Further, an approach of the bilinear interpolation applied on the average distance of k nearest heads with respect to said head center point coordinate is configured as following: assuming that coordinates of the vertices A, B, C, and D of the rectangular area respectively are:

$(p_{reg\_x}[i], p_{reg\_y}[j])$, $(p_{reg\_x}[i+1], p_{reg\_y}[j])$, $(p_{reg\_x}[i], p_{reg\_y}[j+1])$, $(p_{reg\_x}[i+1], p_{reg\_y}[j+1])$, performing a linear interpolation in the x direction and the y direction, respectively, according to a principle of the bilinear interpolation;

performing, at first, a interpolation in the x direction to obtain estimated values of average distance $\bar{d}_{ks\_esti}[i, j, r, R_1]$, $\bar{d}_{ks\_esti}[i, j, r, R_2]$ of k nearest heads with respect to two points $R_1$, $R_2$ that have the same x-coordinates with that of said head center point coordinate;

performing, then, a linear interpolation in the y direction:

$$\bar{d}_{ks\_esti}[i, j, r] = \frac{p_{reg\_y}[i+1] - p_{head\_y}}{p_{reg\_y}[i+1] - p_{reg\_y}[i]} \bar{d}_{ks\_esti}[i, j, r, R_1] +$$

$$\frac{p_{head\_y} - p_{reg\_y}[i]}{p_{reg\_y}[i+1] - p_{reg\_y}[i]} \bar{d}_{ks\_esti}[i, j, r, R_2]$$

obtaining, finally, the estimated value of average distance $\bar{d}_{ks\_esti}[i, j, r]$ of k nearest heads with respect to said head center point coordinate.

Further, the estimated values of average distance $\bar{d}_{ks\_esti}[i, j, r, R_1]$, $\bar{d}_{ks\_esti}[i, j, r, R_2]$ of k nearest heads are, respectively:

$$\bar{d}_{ks\_esti}[i, j, r, R_1] =$$

$$\frac{p_{reg\_x}[i+1] - p_{head\_x}}{p_{reg\_x}[i+1] - p_{reg\_x}[i]} \bar{d}_{ks}[i, j] + \frac{p_{head\_x} - p_{reg\_x}[i]}{p_{reg\_x}[i+1] - p_{reg\_x}[i]} \bar{d}_{ks}[i+1, j];$$

$$\bar{d}_{ks\_esti}[i, j, r, R_2] = \frac{p_{reg\_x}[i+1] - p_{head\_x}}{p_{reg\_x}[i+1] - p_{reg\_x}[i]} \bar{d}_{ks}[i, j+1] +$$

$$\frac{p_{head\_x} - p_{reg\_x}[i]}{p_{reg\_x}[i+1] - p_{reg\_x}[i]} \bar{d}_{ks}[i+1, j+1].$$

Further, in the step 3), first, obtaining a mean $\mu_{d_{ks}}[i, j, r]$ and a variance $\sigma_{d_{ks}}[i, j, r]$ according to average distances of k nearest heads with respect to respective k nearest heads surrounding said head [i, j, r], then dividing an absolute value of a difference between the average distance of k nearest heads with respect to a head center point coordinate of said head and the mean $\mu_{d_{ks}}[i, j, r]$ of the average distances of k nearest heads with respect to the respective k nearest heads surrounding said head by the variance $\sigma_{d_{ks}}[i, j, r]$ of the average distances of k nearest heads with respect to respective k nearest heads surrounding said head, and using a value resulted through the division as weight coefficients θ for, respectively, the average distance of k nearest heads with respect to said head and the estimated value thereof.

Further, in the step 4), a method for calculating a size of a Gaussian kernel corresponding to the head center point coordinate of the current person is configured to: first, add a product that multiplies a difference of 1 minus the adaptive weight coefficient θ by the average distance of k nearest heads from the current head center point coordinate to a product that multiplies the adaptive weight coefficient θ by the estimated value of average distance $\bar{d}_{ks\_esti}[i, j, r]$ of k nearest heads from the current head center point coordinate so that an adaptive weighted average distance of k nearest heads with respect to said head is obtained; then, incorporate the adaptive weighted average distance of k nearest heads $\bar{d}_{ks\_new}[i, j, r]$ into a traditional Gaussian kernel calculation method to replace an average distance of k nearest heads with respect to said head therein so that the size of the Gaussian kernel corresponding to the head center point coordinate of the current person is obtained.

By using these above, the present disclosure has the following advantages: 1. An adaptive calculation used by a traditional crowd counting system for adaptively calculating a size of a Gaussian kernel corresponding to a human head simply depends on an average distance of the human head from its k nearest neighboring heads such that a large error is induced at a location where a crowd density is uneven. As a resulted, a head size of this location in the original image is far away from a size of a Gaussian kernel in a crowd density map which serves as a training target so that iterative training of a convolutional neural network of the crowd counting system is hard to be converged, which degrades an accuracy of crowd counting. As such, in the present disclosure, information contained in those known data has be fully excavated, and relationships between various head center point coordinates of respective persons in the training data have been employed to the greatest extent, so that calculation regarding an average distance of k nearest heads surrounding a head and a size of this head are implemented in a more accurate manner, feature similarity between the crowd density map in the training data and the real image is effectively increased, it is more readily for the convolutional neural network to learn a regular pattern between the training data and the real image so as to accelerate convergence of its iterative process, and an accuracy of the crowd counting system may be improved. 2. The present disclosure can be directly nested in a Gaussian kernel generation method of a traditional crowd counting system and effectively share a convolutional neural network structure and input data with the traditional method, and no modification is basically required to be applied on main workflow of the original crowd counting system, which thereby costs a small amount of work. 3. In practical usage, not only an amount of calculation of the method is much smaller than that of training process of the convolutional neural network itself, but also the method is implemented completely during a pre-processing stage of the training data and is executed once without being calculated repeatedly along with the training iteration of the convolutional neural network, which thereby does not significantly increase a total computational complexity of the system. 4. Those steps in the process of adaptively calculating the size of the Gaussian kernel, such as the bilinear interpolation and a sum of uncorrelated random variables being approximated to a normal distribution, all follow rigorous mathematical principles so as to ensure theoretical reliability of the method. 5. All steps of the present disclosure are fully automated without either additional operation to be conducted by a user during the execution or related data to be re-measured by the user, saving work labor, material resources and time costs.

BRIEF DESCRIPTION OF THE DRAWINGS

FIG. 1 schematically shows an overall flow chart of the present disclosure.

DETAILED DESCRIPTION OF THE EMBODIMENTS

The present disclosure will be described in detail below with reference to the drawings and embodiments.

As shown in FIG. 1, the present disclosure provides a method for adaptively calculating a size of a Gaussian kernel in a crowd counting system, which includes the following steps.

1) Divide a crowd density map into several rectangular areas at equal intervals:

A size of the crowd density map in training data generated by Gaussian kernels of a traditional crowd counting system as well as head center point coordinates of every persons (i.e., a center point coordinate of a Gaussian kernel corresponding to a person's head) are read in a sequential order. For the crowd density map, it is divided into m and n segments at equal intervals along directions of the x axis and the y axis, respectively, and thus m×n rectangular areas are formed in the crowd density map. An x-axis coordinate and a y-axis coordinate of a vertex of each area that is closest to the origin of the coordinate system are $p_{reg\_x}[i]$ (where i=1, . . . , m) and $p_{reg\_y}[j]$ (where j=1, . . . , n), respectively. Every four vertices determine one rectangular area. For a head center point coordinate ($p_{head\_x}$, $p_{head\_y}$), if it is located between $p_{reg\_x}[i]$, $p_{reg\_x}[i+1]$ in the x axis direction and between $p_{reg\_y}[j]$, $p_{reg\_y}[j+1]$ in the y axis direction, then said head center point coordinate belongs to an area [i, j].

$$p_{reg\_x}[i] \leq p_{head\_x} < p_{reg\_x}[i+1] \quad (3)$$

$$p_{reg\_y}[j] \leq p_{head\_y} < p_{reg\_y}[j+1] \quad (4)$$

If there are more than one head center coordinates in the area, then the rth head therein is referred to be as [i, j, r].

2) Calculate an estimated value of average distance of k nearest heads from a head center point coordinate of a current person.

2.1) An average distance of k nearest heads from a vertex coordinate of a current area is calculated:

For every vertices of the current rectangular area, a vertex of the current area that is closest to the origin of the coordinate system is taken as an example. If there is no head center point coordinate in rectangular areas adjacent to the vertex of the current area, then the average distance $\bar{d}_{ks}[i, j]$ of k nearest heads from the vertex is vacant, and none of rectangular areas that are adjacent to said vertex should be involved into subsequent calculation of the following steps;

If there is one head center point coordinate and only the one in the rectangular areas adjacent to the vertex of the current area, then the average distance $\bar{d}_{ks}[i, j]$ of k nearest heads from said vertex is directly equal to a value $\bar{d}_{ks}[i, j, 1]$ of this head center point coordinate:

$$\bar{d}_{ks}[i, j] = \bar{d}_{ks}[i, j, 1] = \sqrt{(p_{head\_x}[i, j, 1])^2 + (p_{head\_y}[i, j, 1])^2} \quad (5)$$

If there are multiple head center coordinates in the rectangular areas adjacent to the vertex of the current area, then k heads having the shortest distances from the vertex coordinate are taken (if there are less than k, then take the heads as many as possible). Then, an outcome of dividing 1 by a sum of a distance between an individual head center point coordinate and the vertex plus a very small positive number ε that prevents the denominator from being zero is applied as a weight coefficient $c_{ks}[i, j, r]$ of the average distance of k nearest heads with respect to said head. Then, a value calculated in a weighted averaging manner as following is used as an average distance $\bar{d}_{ks}[i, j]$ of k nearest heads with respect to said vertex: a sum of products, each of the products being a result of multiplying the average distance $\bar{d}_{ks}[i, j, r]$ of k nearest heads with respect to one of all heads by its corresponding weight coefficient $c_{ks}[i, j, r]$, is divided by a sum of the weight coefficients corresponding to respective heads:

$$\bar{d}_{ks}[i, j] = \frac{\sum_{r=1}^{k} \bar{d}_{ks}[i, j, r] \cdot c_{ks}[i, j, r]}{\sum_{r=1}^{k} c_{ks}[i, j, r]} \quad (6)$$

$$c_{ks}[i, j, r] = \frac{1}{\varepsilon + \sqrt{(p_{head\_x}[i, j, 1] - p_{reg\_x}[i])^2 + (p_{head\_y}[i, j, 1] - p_{reg\_y}[j])^2}} \quad (7)$$

Using the weight coefficient $c_{ks}[i, j, r]$, it ensures that the closer a head center point coordinate approaches said vertex, the greater a weight of the average distance of k nearest heads corresponding to the head center point coordinate is.

These above processes are repeated to obtain average distances $\bar{d}_{ks}[i+1, j]$, $\bar{d}_{ks}[i, j+1]$, $\bar{d}_{ks}[i+1, j+1]$ of k nearest heads with respect to respective other three vertices in the current area.

2.2) Bilinear interpolation is applied to obtain estimated values of average distance of k nearest heads with respect to every head center point coordinates in each area:

By applying bilinear interpolation on respective average distances of k nearest heads with respect to respective vertices of an area, an estimated value of average distance of k nearest heads from any head center point in the area can be obtained. In fact, existing documents regarding estimating a perspective map has delivered somehow an idea of interpolation, except that original data used for the interpolation is about a height of a person whose entire body can be detected. However, in a scene of dense crowd, it is hard to guarantee, due to mutual occlusion by one another, that persons observed at a key location have not been occluded with their entire body. Therefore, the present disclosure further provides that average distances of k nearest heads with respect to vertices of an area that each head center point coordinate belongs to are adopted to be perform the interpolation so as to obtain a change trend of perspective relationship in an image. Further, considering that a horizontal plane of a camera's field of view might be not always parallel to a horizontal plane of a perspective map, bilinear interpolation is applied accordingly. A specific approach of the bilinear interpolation is as follows.

After the average distances $\bar{d}_{ks}[i, j]$, $\bar{d}_{ks}[i+1, j]$, $\bar{d}_{ks}[i, j+1]$, $\bar{d}_{ks}[i+1, j+1]$ of k nearest heads with respect to respective four vertices of a certain rectangular area are obtained, the bilinear interpolation method may be used to calculate an estimated value of average distance of k nearest heads from anyone of the head center point coordinates within the rectangular area, then the one is marked as a head center point coordinate of which a size of its Gaussian kernel has been calculated.

The specific approach of the bilinear interpolation applied with respect to the average distance of k nearest heads from said head center point coordinate is as follows:

It is assumed that coordinates of the vertices A, B, C, and D of the rectangular area, respectively, are:

$(p_{reg\_x}[i], p_{reg\_y}[j])$, $(p_{reg\_x}[i+1], p_{reg\_y}[j])$, $(p_{reg\_x}[i], p_{reg\_y}[j+1])$, $(p_{reg\_x}[i+1], p_{reg\_y}[j+1])$, According to the principle of bilinear interpolation, a linear interpolation is performed in the x direction and the y direction, respectively. First, the interpolation is performed in the x direction to obtain estimated values of average distance $\bar{d}_{ks\_esti}[i, j, r, R_1]$, $\bar{d}_{ks\_esti}[i, j, r, R_2]$ of k nearest heads with respect to two points $R_1$, $R_2$ that have the same x-coordinates with that of said head center point coordinate:

$$\bar{d}_{ks\_esti}[i, j, r, R_1] = \qquad (8)$$
$$\frac{p_{reg\_x}[i+1] - p_{head\_x}}{p_{reg\_x}[i+1] - p_{reg\_x}[i]}\bar{d}_{ks}[i, j] + \frac{p_{head\_x} - p_{reg\_x}[i]}{p_{reg\_x}[i+1] - p_{reg\_x}[i]}\bar{d}_{ks}[i+1, j]$$

$$\bar{d}_{ks\_esti}[i, j, r, R_2] = \frac{p_{reg\_x}[i+1] - p_{head\_x}}{p_{reg\_x}[i+1] - p_{reg\_x}[i]}\bar{d}_{ks}[i, j+1] + \qquad (9)$$
$$\frac{p_{head\_x} - p_{reg\_x}[i]}{p_{reg\_x}[i+1] - p_{reg\_x}[i]}\bar{d}_{ks}[i+1, j+1]$$

Then, a linear interpolation is performed in the $y$ direction:

$$\bar{d}_{ks\_esti}[i, j, r] = \frac{p_{reg\_y}[i+1] - p_{head\_y}}{p_{reg\_y}[i+1] - p_{reg\_y}[i]}\bar{d}_{ks\_esti}[i, j, r, R_1] + \qquad (10)$$
$$\frac{p_{head\_y} - p_{reg\_y}[i]}{p_{reg\_y}[i+1] - p_{reg\_y}[i]}\bar{d}_{ks\_esti}[i, j, r, R_2]$$

Finally, the estimated value of average distance $\bar{d}_{ks\_esti}[i, j, r]$ of k nearest heads from said head center point coordinate is obtained.

3) Calculate a weight coefficient of the average distance of k nearest heads from the head center point coordinate of the current person and a weight coefficient of the estimated value:

Obviously, apart from an average distance of k nearest heads that is calculated directly relative to a head center point coordinate of a person, the above-calculated estimated value of average distance of k nearest heads takes more into account situations of other person's head coordinates that surround said person's head coordinate, and significantly filters out an impact of an isolated coordinate, that has abnormal distances from other surrounding coordinate points, on the calculation of the average distance of k nearest heads so that an overall trend of distance change among the heads in the image can be reflected.

Therefore, the present disclosure wishes to provide a method for adaptively adjusting a dynamic weight distribution so as to reach a balance between an actual calculated value and an estimated value. A purpose thereof is that once it is judged that the average distance of k nearest heads from said head center point coordinate is more likely to be a special case of an isolated coordinate that has abnormal distances from other surrounding points, it is more intended to believe that such distance abnormality is due to an overlap between relatively large heads at the close view, or due to a person at the distant view who is relatively far away from other persons. At this time, a weight of the estimated value of average distance of k nearest heads should be increased appropriately, so a relatively smooth result estimated by performing the interpolation towards distances of the surrounding heads is more credible. On the contrary, once it is judged that the average distance of k nearest heads from said head center point coordinate is not a special case within a certain area, it is more inclined to believe that this distance is indeed resulted from the perspective relationship, i.e., a big look at near and a small look in the distance, so the average distance of k nearest heads that is calculated directly relative to the head center point coordinate itself is more credible.

To simplify a mathematical model of random variables and improve the practicability of the algorithm, a normal distribution model is used as an approximation to an exact probability distribution of random parameters, and a probability boundary that is approximate to normal distribution parameters is directly adopted, such that a judgment determined by the algorithm about whether a random variable value belongs to small-probability abnormality can be guided and a success rate that is significantly higher than traditional methods can be achieved thereby.

In an scenario of the present disclosure, it is assumed that there is no significant correlation among distances from person to person, because the sum of distances of k nearest heads from any head center point coordinate belongs to a sum of a few random parameters, and also because k is a predetermined constant. As a result, an average distance of k nearest heads can be regarded as an approximate normal distribution. An interval obtained through a mean minus/plus three times of a variance may be used as a basis for judging whether a coordinate has an abnormal distance. A specific approach is as follows.

First, a mean $\mu_{d_{ks}}[i, j, r]$ and a variance $\sigma_{d_{ks}}[i, j, r]$ are obtained according to average distances of k nearest heads with respect to respective k nearest heads around said head [i, j, r]. Then, an absolute value of a difference between an average distance of k nearest heads from a head center point coordinate of said head and the mean $\mu_{d_{ks}}[i, j, r]$ of the average distances of k nearest heads with respect to the respective k nearest heads around said head is divided by the variance $\sigma_{d_{ks}}[i, j, r]$ of the average distances of k nearest heads with respect to respective k nearest heads around said head, and a value resulted from the division is used as an adaptive weight coefficient θ between an estimated value of said head and a directly calculated value of said head:

$$\theta = \begin{cases} 0, & |\bar{d}_{ks\_esti}[i, j, r] - \mu_{d\_ks}[i, j, r]| = 0 \\ \frac{|\bar{d}_{ks\_esti}[i, j, r] - \mu_{d_{ks}}[i, j, r]|}{3\sigma_{d_{ks}}[i, j, r]}, & 0 < |\bar{d}_{ks\_esti}[i, j, r] - \mu_{d\_ks}[i, j, r]| < \mu_{d_{ks}}[i, j, r] + 3\sigma_{d_{ks}}[i, j, r] \\ 1, & |\bar{d}_{ks\_esti}[i, j, r] - \mu_{d\_ks}[i, j, r]| \geq \mu_{d_{ks}}[i, j, r] + 3\sigma_{d_{ks}}[i, j, r] \end{cases} \qquad (11)$$

4) Calculate a size of a Gaussian kernel corresponding to the head center point coordinate of the current person:

An adaptive weighted average distance $\bar{d}_{ks\_new}[i, j, r]$ of k nearest heads of said head is obtained by adding a product that multiplies a difference of 1 minus the adaptive weight coefficient θ by the average distance of k nearest heads from the current head center point coordinate to a product that multiplies the adaptive weight coefficient θ by the estimated value of average distance $\bar{d}_{ks\_esti}[i, j, r]$ of k nearest heads from the current head center point coordinate.

$$\bar{d}_{ks\_new}[i,j,r]=(1-\theta)\cdot\bar{d}_{ks}[i,j,r]+\theta\cdot\bar{d}_{ks\_esti}[i,j,r] \quad (12)$$

The adaptive weighted average distance $\bar{d}_{ks\_new}[i, j, r]$ of k nearest heads is incorporated into the traditional Gaussian kernel calculation method (Equation 2) to replace an average distance of k nearest heads from said head therein. Thus, a size of the Gaussian kernel corresponding to the current head center point coordinate can be obtained.

The above method can obtain, by using the adaptive weight coefficient θ that is able to adaptively adjust itself a judgment about whether a distance from said head belongs to an isolated abnormality comparing with those distances from surrounding heads of said head such that a compromise between an estimated value of average distance $\bar{d}_{ks\_esti}[i, j, r]$ of k nearest heads that represents a trend of average distance around said head coordinate and an actual calculated value of average distance of k nearest heads the represents a feature of said head's own can be reached and a situation where a size of the Gaussian kernel of the head is incorrectly determined due to an isolated point having an abnormal distance can be avoided in the process of calculating the geometry-adaptation-based Gaussian kernels by the Equation 2.

5) Determine whether there is any head center point coordinate of which a size of a Gaussian kernel has not been calculated in the training data:

If there are head center point coordinates in the training data for which sizes of Gaussian kernels have not been calculated, it is proceeded back to the step 2); if not, all sizes of Gaussian kernels that have been calculated are output as a result, and then the process ends.

In summary, the training data only head center point coordinates of every person, but no information about a size of each head or a length of each person that can reflect a perspective relationship in a picture is contained. The system is impossible to require to supplementary these items in the training data just for improvement of an accuracy of a generated crowd density map, because it requires to re-label an entire training database to do so, that costs a lot. In order to solve the above-mentioned problem, the present disclosure provides that the original picture is divided into several rectangular areas in an equal manner according to the number of pixels of the original picture as well as the number of people labeled therein. In each area, bilinear interpolation is adopted to obtain an estimated value of average distance of k nearest heads with respect to a head center point coordinate of each person. Then, the estimated value of average distance of k nearest heads and an average distance of k nearest heads from the person's head that is resulted through a direct calculation are weighted and averaged using an adaptively adjusted weight coefficient. As a result, an optimized average distance of k nearest heads is obtained, based on which a size of a Gaussian kernel that fits to the practical situation is calculated.

The above-mentioned adaptively adjusted weight coefficient is determined through an average distance of a certain head's k nearest heads within the area where said head is located, together with a mean and a variance of average distances of k nearest heads with respect to the respective k nearest heads surrounding said head. A purpose of this is to reduce a weight of a specific head of which an average distance significantly abnormal relative to its surrounding heads. In calculation of the average distance of k nearest heads with respect to this kind of head, an estimated value based on the surrounding heads is more reliable. This is because that, for most of video surveillance scenes, a position that a camera hangs is high enough and thus forms a slightly downward view angle such that an impact of the uneven ground on a head size is far less than an impact resulted from a perspective relationship i.e., a big look at near and a small look in the distant. Abnormality of an average distance of k nearest heads from an isolated person's head center point coordinate of is more likely to be induced by, simply, a horizontal distance, rather than a head size abnormality that is due to an extremely abnormal distance between this head and a camera. Once only there are too many heads each having an abnormal average distance of k nearest heads in this area so that the variance is large enough, the abnormality is more likely to be induced by that a big head at near and a small head in the distant are appearing at similar positions in the picture at the same time. Only in this case, an average distance of k nearest heads with respect to each abnormal head is more reliable.

The present disclosure focuses on a problem that an adaptive calculation used by a traditional crowd counting system for adaptively calculating a size of a Gaussian kernel corresponding to a human head simply depends on an average distance of the human head from its k nearest neighboring heads such that a large error is induced especially at a location where a crowd density is uneven. As a resulted, a head size of this location in the original image is far away from a size of a Gaussian kernel in a crowd density map that serves as a training target so that iterative training of a convolutional neural network of the crowd counting system is hard to be converged, thereby degrading an accuracy of crowd counting. Without increasing inputs of types and quantity of the training data, it is provided by the present disclosure that an original picture is divided into several rectangular areas in an equal manner, bilinear interpolation is adopted in each area to obtain an estimated value of average distance of k nearest heads with respect to a head center point coordinate of each person, then the estimated value of average distance of k nearest heads and an average distance of k nearest heads from the head, that is resulted through a direct calculation, are weighted and averaged using an adaptively adjusted weight coefficient. As a result, an optimized average distance of k nearest heads is obtained, based on which a size of a Gaussian kernel that is further fit to an practical situation is calculated and serves as a training target of the convolutional neural network, so that the iterative training of the network is easy to be converged and increasing of accuracy of the crowd counting system is ultimately achieved.

The foregoing embodiments are only used to illustrate the present disclosure, and change may be performed to respective steps thereof. On the basis of the technical solution of the present disclosure, any modification and equivalent transformation performed to an individual step according to the principles of the present disclosure should not be excluded outside the protection scope of the present disclosure.

The invention claimed is:

1. A method for adaptively calculating a size of a Gaussian kernel in a crowd counting system, wherein the method comprises steps of:

1) dividing a crowd density map into m×n rectangular areas at equal intervals;
2) calculating an estimated value of average distance of k nearest heads from a head center point coordinate of a current person;
3) calculating a weight coefficient θ for an average distance of k nearest heads from the head center point coordinate of the current person and the estimated value;
4) calculating a size of a Gaussian kernel corresponding to the head center point coordinate of the current person;
5) determining whether there are any head center point coordinates of which sizes of Gaussian kernels have not been calculated yet in training data: if there are head center point coordinates of which the sizes of the Gaussian kernels have not been calculated in the training data, proceeding to the step 2); if not, outputting all sizes of Gaussian kernels that have been calculated as a result, and ending.

2. A method according to claim 1, wherein in the step 1), dividing the crowd density map into m×n areas at equal intervals is configure to divide the crowd density map into m and n segments at equal intervals along directions of x axis and y axis, respectively, and form m×n rectangular areas in the crowd density map, wherein ax-axis coordinate and a y-axis coordinate of a vertex of each area that is closest to origin of a coordinate system are $p_{reg\_x}[i]$ and $p_{reg\_y}[j]$, respectively; every four vertices determine one rectangular area; and if a head center point coordinate $(p_{head\_x}, p_{head\_y})$ is located between $p_{reg\_x}[i]$, $p_{reg\_x}[i+1]$ in the x axis direction and between $p_{reg\_y}[j]$, $p_{reg\_y}[j+1]$ in the y axis direction, then the head center point coordinate belongs to an area [i, j], where i=1, . . . , m, and j=1, . . . , n.

3. A method according to claim 2, wherein if there are more than one head center coordinates within the area [i, j], then the rth head in the area is referred to be as [i, j, r].

4. A method according to claim 1, wherein in the step 2), the estimated value of average distance of k nearest heads from the head center point coordinate of the current person is calculated by:
   2.1) calculating an average distance of k nearest heads from a vertex coordinate of the current area; and
   2.2) applying bilinear interpolation to obtain estimated values of average distance of k nearest heads with respect to head center point coordinates of every persons within each area.

5. A method according to claim 4, wherein in the step 2.1), a vertex of the current area that is closest to the origin of the coordinate system is taken as an example, if there is one head center point coordinate and the only one in rectangular areas adjacent to the vertex of the current area, an average distance $\bar{d}_{ks}[i,j]$ of k nearest heads from the vertex is directly equal to a value of the head center point coordinate;
if there are multiple head center coordinates in the rectangular areas adjacent to the vertex of the current area, then k heads having the shortest distances from a coordinate of the vertex are taken, and an outcome of dividing 1 by a sum of a distance between a head center point coordinate of an individual head and the vertex plus a very small positive number ε that prevents denominator from being zero is applied as a weight coefficient $c_{ks}[i,j,r]$ of the average distance of k nearest heads with respect to an individual head, then a value calculated in a weighted averaging manner as following serves as an average distance $\bar{d}_{ks}[i,j]$ of k nearest heads with respect to the vertex: dividing a sum of products, each of the products being a result of multiplying an average distance $\bar{d}_{ks}[i,j]$ of k nearest heads with respect to one of all heads by a corresponding weight coefficient $c_{ks}[i,j,r]$ thereof, by a sum of weight coefficients corresponding to respective heads; and wherein if a number of the multiple head center coordinates is less than k, then taking as many as possible; and
repeating to obtain average distances $\bar{d}_{ks}[i+1,j]$, $\bar{d}_{ks}[i,j+1]$, $\bar{d}_{ks}[i+1,j+1]$ of k nearest heads with respect to respective other three vertices in the current area.

6. A method according to claim 5, wherein in the step 2.2), after average distances $\bar{d}_{ks}[i,j]$, $\bar{d}_{ks}[i+1,j]$, $\bar{d}_{ks}[i,j+1]$, $\bar{d}_{ks}[i+1,j+1]$ of k nearest heads with respect to respective four vertices of a certain rectangular area are obtained, applying bilinear interpolation method to calculate an estimated value of average distance of k nearest heads with respect to anyone of the head center point coordinates within the rectangular area, and then labeling said one as a head center point coordinate of which a size of a Gaussian kernel has been calculated.

7. A method according to claim 6, wherein the bilinear interpolation method applied on the average distance of k nearest heads with respect to the head center point coordinate is configured to:
assume that coordinates of the vertices A, B, C, and D of the rectangular area are, respectively:

$(p_{reg\_x}[i], p_{reg\_y}[j])$, $(p_{reg\_x}[i+1], p_{reg\_y}[j])$, $(p_{reg\_x}[i], p_{reg\_y}[j+1])$, $(p_{reg\_x}[i+1], p_{reg\_y}[j+1])$, perform a linear interpolation in the x direction and they direction, respectively, according to a principle of the bilinear interpolation;
performing, first, a interpolation in the x direction to obtain estimated values of average distance $\bar{d}_{ks\_esti}[i,j,r,R_1]$, $\bar{d}_{ks\_esti}[i,j,r,R_2]$ of k nearest heads with respect to two points $R_1$, $R_2$ that have identical x-coordinates with that of said head center point coordinate;
performing, then, a linear interpolation in they direction:

$$\bar{d}_{ks\_esti}[i,j,r] = \frac{p_{reg\_y}[i+1] - p_{head\_y}}{p_{reg\_y}[i+1] - p_{reg\_y}[i]} \bar{d}_{ks\_esti}[i,j,r,R_1] +$$

$$\frac{p_{head\_y} - p_{reg\_y}[i]}{p_{reg\_y}[i+1] - p_{reg\_y}[i]} \bar{d}_{ks\_esti}[i,j,r,R_2];$$

obtaining, finally, the estimated value of average distance $\bar{d}_{ks\_esti}[i,j,r]$ of k nearest heads with respect to the head center point coordinate.

8. A method according to claim 7, wherein
the estimated values of average distance $\bar{d}_{ks\_esti}[i,j,r,R_1]$, $\bar{d}_{ks\_esti}[i,j,r,R_2]$ of k nearest heads are, respectively:

$$\bar{d}_{ks\_esti}[i,j,r,R_1] = $$
$$\frac{p_{reg\_x}[i+1] - p_{head\_x}}{p_{reg\_x}[i+1] - p_{reg\_x}[i]} \bar{d}_{ks}[i,j] + \frac{p_{head\_x} - p_{reg\_x}[i]}{p_{reg\_x}[i+1] - p_{reg\_x}[i]} \bar{d}_{ks}[i+1,j];$$

$$\bar{d}_{ks\_esti}[i,j,r,R_2] = \frac{p_{reg\_x}[i+1] - p_{head\_x}}{p_{reg\_x}[i+1] - p_{reg\_x}[i]} \bar{d}_{ks}[i,j+1] +$$
$$\frac{p_{head\_x} - p_{reg\_x}[i]}{p_{reg\_x}[i+1] - p_{reg\_x}[i]} \bar{d}_{ks}[i+1,j+1].$$

9. A method according to claim 1, wherein in the step 3), first, obtaining a mean $\mu_{d_{ks}}[i, j, r]$ and a variance $\sigma_{d_{ks}}[i, j, r]$ according to average distances of k nearest heads with respect to respective k nearest heads surrounding said head [i, j, r], then dividing an absolute value of a difference between the average distance of k nearest heads with respect to a head center point coordinate of said head and the mean $\mu_{d_{ks}}[i, j, r]$ of the average distances of k nearest heads with respect to the respective k nearest heads surrounding said head by the variance $\sigma_{d_{ks}}[i, j, r]$ of the average distances of k nearest heads with respect to the respective k nearest heads surrounding said head, and using a value resulted therefrom as a weight coefficient θ for, respectively, the average distance of k nearest heads with respect to said head and the estimated value.

10. A method according to claim 1, wherein in the step 4), a calculating method for a size of a Gaussian kernel corresponding to the head center point coordinate of the current person is configured to:

at first, a product that multiplies a difference of 1 minus the adaptive weight coefficient θ by the average distance of k nearest heads from the head center point coordinate of the current person to a product that multiplies the adaptive weight coefficient θ by the estimated value of average distance $\bar{d}_{ks\_esti}[i, j, r]$ of k nearest heads from the head center point coordinate of the current person so that an adaptive weighted average distance of k nearest heads with respect to the current person's head is obtained;

incorporate, then, the adaptive weighted average distance $\bar{d}_{ks\_new}[i, j, r]$ of k nearest heads into a traditional Gaussian kernel calculation method to replace an average distance of k nearest heads with respect to the current person's head therein so that the size of the Gaussian kernel corresponding to the head center point coordinate of the current person is obtained.

* * * * *